United States Patent
Venkataraman et al.

(10) Patent No.: US 8,166,215 B2
(45) Date of Patent: Apr. 24, 2012

(54) METHOD TO CONTROL DELAY BETWEEN LANES

(75) Inventors: Srikrishnan Venkataraman, Bangalore (IN); Jayashree Kar, Saratoga, CA (US); Sudarshan D. Solanki, Bangalore (IN); Priyavadan Ramdas Patel, Bangalore (IN); Michael M. DeSmith, Beaverton, OR (US); David G. Figueroa, Tolleson, AZ (US)

(73) Assignee: Intel Corporation, Santa Clara, CA (US)

(*) Notice: Subject to any disclaimer, the term of this patent is extended or adjusted under 35 U.S.C. 154(b) by 745 days.

(21) Appl. No.: 11/322,059

(22) Filed: Dec. 28, 2005

(65) Prior Publication Data

US 2007/0150197 A1    Jun. 28, 2007

(51) Int. Cl.
- G06F 3/00 (2006.01)
- G06F 5/00 (2006.01)
- H03K 3/00 (2006.01)
- H03K 17/16 (2006.01)
- G03F 1/00 (2006.01)

(52) U.S. Cl. ............ 710/58; 327/310; 326/26; 713/300
(58) Field of Classification Search ............ 710/58
See application file for complete search history.

(56) References Cited

U.S. PATENT DOCUMENTS

| | | | | |
|---|---|---|---|---|
| 5,767,719 A * | 6/1998 | Furuchi et al. | ............... | 327/281 |
| 6,566,903 B1 * | 5/2003 | Mandal et al. | ............... | 326/30 |
| 6,617,895 B2 * | 9/2003 | Zumkehr et al. | ............... | 327/170 |
| 6,650,575 B1 * | 11/2003 | Khanna | ............... | 365/194 |
| 6,803,797 B2 * | 10/2004 | Park | ............... | 327/158 |
| 7,174,411 B1 * | 2/2007 | Ngai | ............... | 710/316 |
| 7,188,203 B2 * | 3/2007 | Mowry et al. | ............... | 710/262 |
| 2002/0186247 A1 * | 12/2002 | Ohkubo | ............... | 345/772 |
| 2004/0039859 A1 | 2/2004 | He et al. | | |
| 2005/0285653 A1 * | 12/2005 | Chung et al. | ............... | 327/276 |

OTHER PUBLICATIONS

Park, Hyun-Jin et al., "UWB Communication System for Home Entertainment Network," IEEE Transactions on Consumer Electronics, vol. 49, No. 2, May 2003, pp. 302-311.*

Lam, W.-C.D.; Cheng-Kok Koh; Tsao, C.-W.A.; , "Power supply noise suppression via clock skew scheduling," Quality Electronic Design, 2002. Proceedings. International Symposium on , vol., No., pp. 355-360, 2002 doi: 10.1109/ISQED.2002.996772 URL: http://ieeexplore.ieee.org/stamp/stamp.jsp?tp=&arnumber=996772&isnumber=21511.*

Arabi, K.; Saleh, R.; Meng Xiongfei; , "Power Supply Noise in SoCs: Metrics, Management, and Measurement," Design & Test of Computers, IEEE , vol. 24, No. 3, pp. 236-244, May-Jun. 2007 doi: 10.1109/MDT.2007.79 URL: http://ieeexplore.ieee.org/stamp/stamp.jsp?tp=&arnumber=4288267&isnumber=4288255.*

(Continued)

*Primary Examiner* — Tariq Hafiz
*Assistant Examiner* — Dayton Lewis-Taylor
(74) *Attorney, Agent, or Firm* — Caven & Aghevli LLC

(57) ABSTRACT

Method and apparatus to control delay between lanes in an I/O interface is disclosed. To control the delay between the lanes in the I/O system a programmed delay may be determined and introduced between the lanes. For this purpose the effective time "T" of the lanes is determined. The number of lanes "N" in the I/O interface is identified. The programmed lane to lane delay "D" is determined and a delay circuit having the programmed delay may be introduced between the lanes to reduce AC peak to peak noise in the I/O system.

17 Claims, 4 Drawing Sheets

OTHER PUBLICATIONS

Xiaoqing Wen; Miyase, K.; Kajihara, S.; Suzuki, T.; Yamato, Y.; Girard, P.; Ohsumi, Y.; Laung-Terng Wang; , "A novel scheme to reduce power supply noise for high-quality at-speed scan testing," Test Conference, 2007. ITC 2007. IEEE International , vol., No., pp. 1-10, 21-26 Oct. 2007 doi: 10.1109/TEST.2007.4437632.*

* cited by examiner

METHOD TO CONTROL DELAY BETWEEN LANES

BACKGROUND

In a high speed interface such as for example a PCI-E (peripheral components interconnect-express), CSI (common system interface), FBD (fully buffered DIMM) etc, there may be an AC (alternate current) noise caused by a total effective load di/dt (change in current/change in time) that is instantaneous sum of individual lane load and may be sensed by the I/O power supply network. Each lane of an I/O interface may have a transmitter, a receiver and other digital circuits. Each individual lane may generate a lane load. The power supply network may sense an impact of the total effective load of all the operational lanes and may exhibit the AC noise during transmission of clock cycles.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other stances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, elements referred to herein with a common reference label followed by a particular number may be collectively referred to by the reference label alone. For example, lanes 200A, 200B, 200C . . . 200N may be collectively referred to as lanes 200. Similarly delay circuits 210A, 210B . . . 210N may be collectively referred as delays 210.

Figure 1:
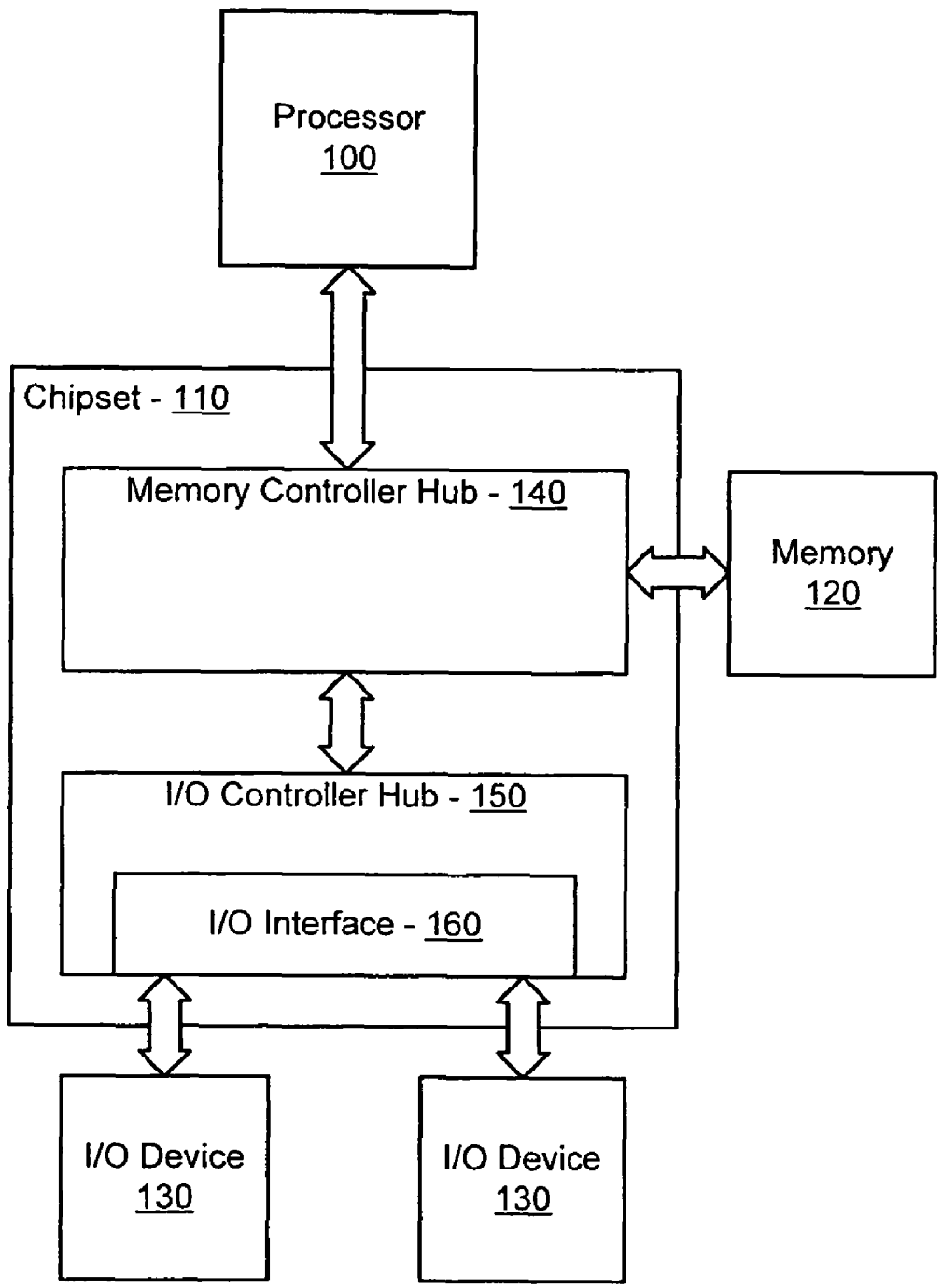
FIG. 1 illustrates an embodiment of a computer system.

Referring to FIG. 1, an embodiment of a computer system is shown. The computer system may include a processor 100, a chipset 110, a memory 120, and I/O (input/output) devices 130. As depicted, the processor 100 may be coupled with the chipset 110 via a processor bus. The memory 120 may be coupled with the chipset 110 via a memory bus. The I/O devices 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc.

The processor 100 may be implemented with an Intel® Pentium® 4 processor, Intel® Pentium® M processor, and/or another type of general purpose processor 100 capable of executing software and/or firmware instructions. In one embodiment, the processor 100 may execute instructions stored in the memory 120 to perform various tasks and to control the overall operation of the computer system. The processor 100 may also execute instructions and/or routines related to power management such as, causing a component such as an I/O interface to reduce AC noise during operation of the system.

The chipset 110 may comprise one or more integrated circuits or chips to couple the processors 100 with other components of the computer system. As depicted, the chipset 110 may comprise a memory controller hub (MCH) 140 and an I/O controller hub (ICH) 150. The memory controller hub 140 may provide an interface to memory devices of the memory 120. In particular, the memory controller hub 140 may generate signals on the memory bus to read and/or write data to memory devices of the memory 120 in response to requests from the processor 100 and I/O devices 130. The memory 120 may comprise for example RAM (Random Access Memory) devices such as source synchronous dynamic RAM devices and DDR (Double Data Rate) RAM devices.

The I/O controller hub 150 according to an embodiment may comprise an I/O interface 160 such as, for example, a PCI Express interface. The I/O interface 160 may interface the I/O devices 130 with the I/O controller hub 150, thus permitting data transfers between the processor 100 and the I/O devices 130 and between the memory 120 and the I/O devices 130. In one embodiment the I/O interface 160 may be present in processor 100 or in memory controller hub 140.

As depicted, the computer system may also comprise I/O devices 130. The I/O device 130 may implement various input/output functions for the computer system. For example, the I/O device 130 may comprise hard disk drives, keyboards, mice, CD (compact disc) drives, DVD (digital video discs) drives, printers, scanners, etc.

Figure 2:
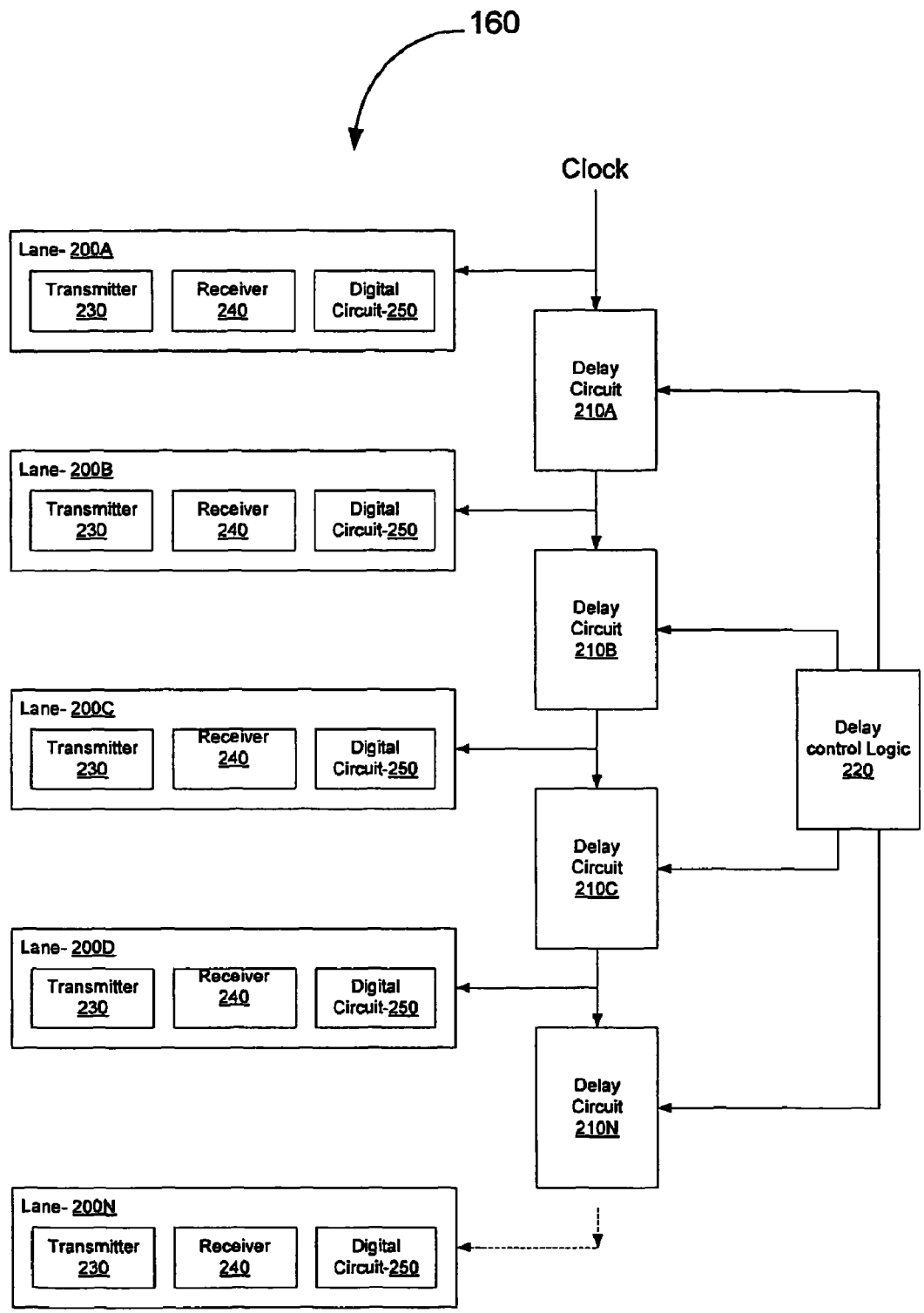
FIG. 2 illustrates an embodiment of an I/O interface system.

Referring to FIG. 2, an embodiment of an I/O interface system 160 is shown. As depicted the I/O interface system 160 may comprise a plurality of lanes 200 such as for example 200A, 200B, 200C . . . 200N, a plurality of delay circuits 210 such as for example 210A, 210B, 210C . . . 210N and a delay control logic 220. The lane 200A may be coupled to the lane 200 B through a delay circuit 210A provided between the lanes 200 A-200 B and lane 200 B may be coupled to the lane 200 C through another delay circuit 210 B provided between the lanes 200B and 200C and so on up to lane 200N having a delay circuit 210N between the adjoining lanes 200. The delay control logic 220 may be coupled to each delay circuit 210A-210N.

As depicted each lane of the lanes 200, in one embodiment, may comprise a transmitter 230, a receiver 240 and a digital circuit 250. When the power is supplied to the I/O system all the lanes 200, may be switched-on simultaneously and due to transmitter 230, receiver 240, and digital circuit 250 in the lanes 200, each lane 200A-200N may contribute a lane load on the power supply network. The power supply network may sense an impact of total effective load di/dt (instantaneous sum of all the individual lane loads) of all the operational lanes 200 and generates an AC noise during operation of the I/O system. The delay circuits 210 may introduce a time delay between the lanes 200 to delay the switching-on of the subsequent lanes 200. In one embodiment the delay time/time constant in the delay circuits 210 may be controlled with the help of the delay control logic 220 by varying the voltage in the delay circuits 210.

In one embodiment and to calculate programmed delay time, an effective period T of the individual lane load in the I/O system may be detected. The effective period T, in one embodiment, may be different from the clock period. The differences in the effective period T may occur due to for example modulation, dual edge clocking, sub multiple clocking etc. Similarly the number of lanes used in the I/O system may be detected. If, for example in the I/O interface, the individual lane load has the effective period "T" and number of lanes is "N", then the programmed delay time may be (D=T/N), wherein "D" is the delay time.

In one embodiment, there may be an intrinsic delay "P" present between the lanes 200. The intrinsic delay may be the delay arising out in the lanes 200 due to the presence of for example clock skew and routing etc. The intrinsic delay may vary from zero to clock period. In the worse case, for example, the intrinsic delay P may be zero and all the lanes may be aligned to generate higher total effective load. The programmed delay in such a situation may be calculated by using the formula (D=T/N−P). The programmed delay D may be introduced between the lanes 200 to switch-on the successive lanes 200 after the programmed delay time.

In one embodiment, by introducing the programmed delay circuits 210 between the lanes 200, individual lane loads may be spaced uniformly to reduce an overlapping and alignment of the loads in the lanes 200. Thus total effective load (instantaneous sum of all the individual lane loads) sensed by the power delivery network may be reduced substantially and the reduction in the total effective load may result in smaller AC peak to peak noise in the I/O system.

Figure 3:
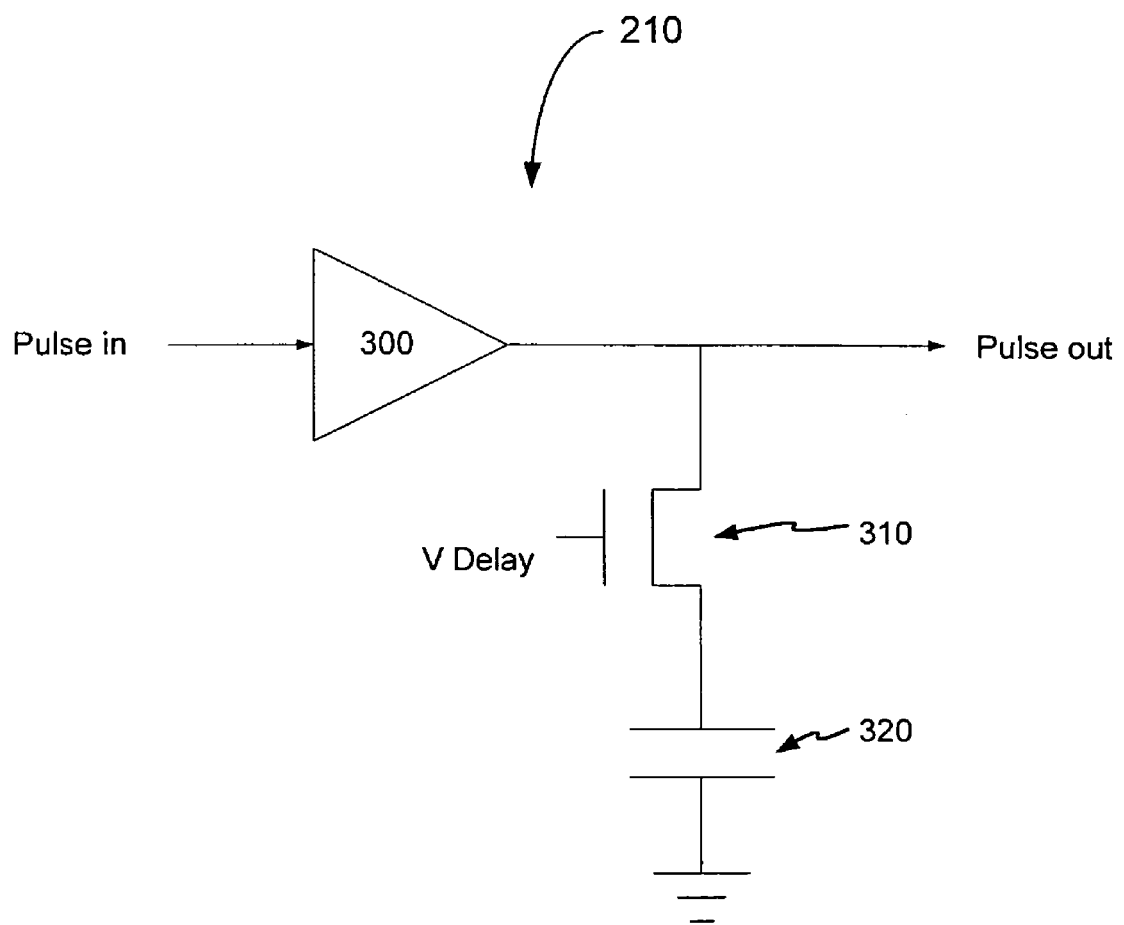
FIG. 3 illustrates an embodiment of delay circuit.

Referring now to FIG. 3, one embodiment of a delay circuit 210 is illustrated. As depicted, the delay circuits 210 may comprise an amplifier 300, a transistor 310 and a capacitor 320. As depicted the amplifier 300 may be coupled with the transistor 310 and the transistor 310 may be coupled with the capacitor 320. The other terminal of the capacitor 320 may be grounded. In one embodiment the amplifier 300 may amplify the pulse received from the previous lanes 200 and convey the amplified pulse to the transistor 310. The transistor 310, in one embodiment may be biased to implement a resistance and the amount of bias voltage V Delay for the transistor 310 may determine the value of the resistance. In one embodiment, the amount of delay time may be determined as a time constant of the RC (resistor, capacitor) network. The time constant may be determined by multiplying the value of the resistance with the value of the capacitor 320 that is time constant=R*C. In one embodiment, the biasing for the transistor 310 may be adjusted and therefore the time delay of the RC network may be adjusted to obtain the programmed lane to lane delay time D.

Figure 4:
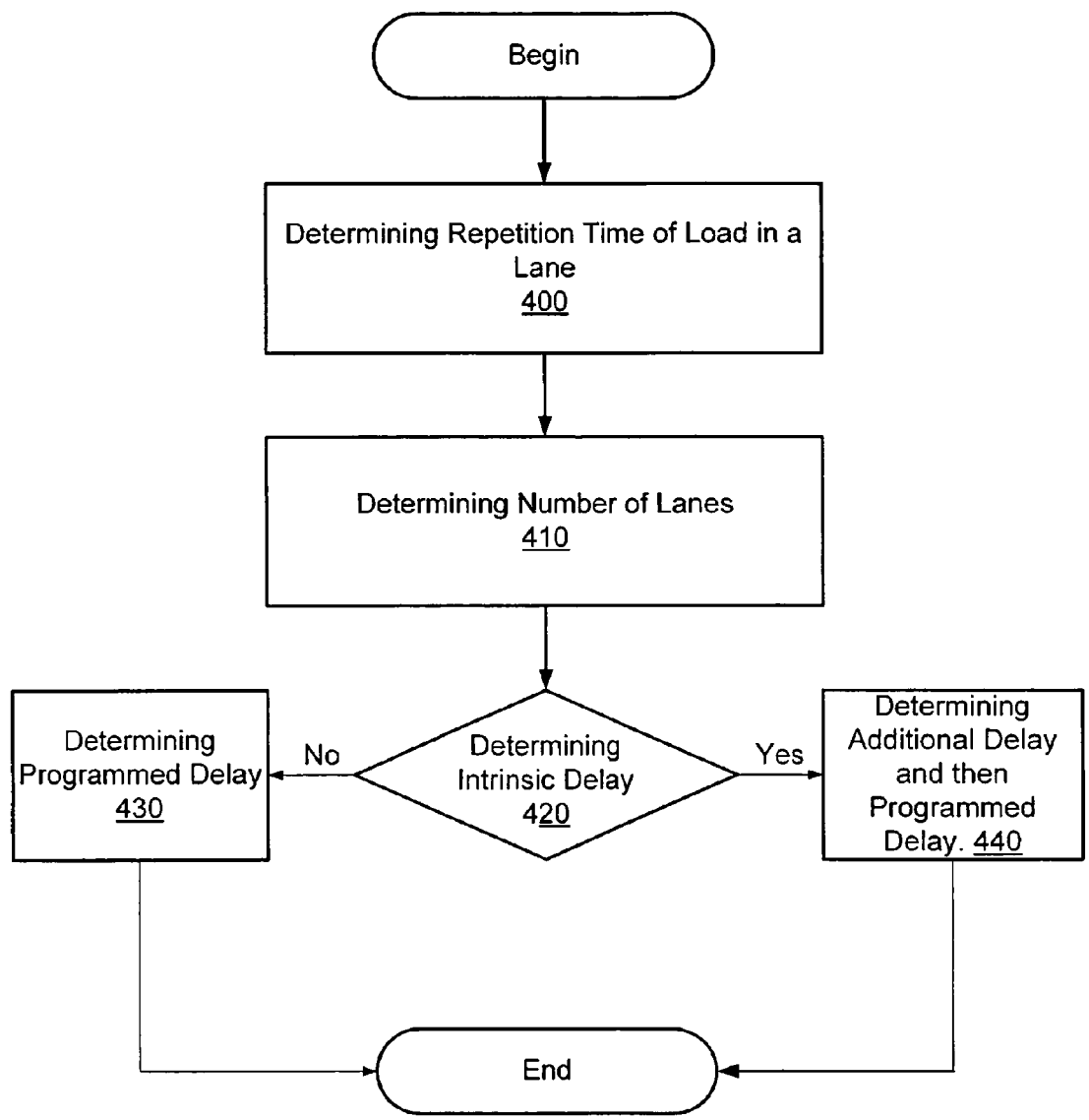
FIG. 4 illustrates an embodiment of delay calculation process that may be implemented by the system of FIG. 1.

Referring now to FIG. 4, an embodiment of programmed delay determination process implementable by the system of FIG. 1 is illustrated. As depicted in block 400, effective repetition time of a load in a lane of an I/O system may be determined. In one embodiment, the repetition time of the load may be given with the model of the I/O system such as for example, PCI express interface in a chipset, may operate with the load having effective repetition period T equal to 600 pico second (T=600 pS).

In block 410, the number of lanes used in the I/O system may be determined. In one embodiment, the number of the lanes may be given, such as for example PCI express interface chipset may comprise 16 lanes (N=16).

In block 420, as depicted, presence and absence of intrinsic delay may be determined so as facilitate determining programmed delay (D). Intrinsic delay may occur due to presence of for example clock skew, routing etc. The programmed delay D may be determined in a different manner, when there is intrinsic delay present in the lanes 200 and when there is no intrinsic delay present in the lanes 200.

In block 430, when there is no intrinsic delay, the programmed delay D may be determined using formula D=T/N. That is by dividing the effective repetition time T by the number of lanes N.

Thus programmed delay D=T/N=600 pS/16=37.5 pS.

Therefore delay circuits 210 having a delay time of 37.5 pS may be introduced between the lanes 200, to switch-on the successive lanes 200 by a time delay of 37.5 ps. Each of the lanes 200B-200N may be switched-on after a time delay of 37.5 pS and the total effective load di/dt (total load of all lanes load), may be reduced to minimum and thus the AC noise may be reduced on the power supply network.

In block 440, when the intrinsic delay "P" is present between the lanes 200, the programmed delay may be determined using formula D=(T/N)−P. Intrinsic delay may occur due to for example clock skew, routing etc.

Thus a delay circuit having a programmed delay D, determined using above formula, may be introduced between the lanes 200 to reduce total effective load and thus to reduce AC noise on the power supply network.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to reduce Alternate Current (AC) peak to peak power supply noise by controlling delay between power supply lanes comprising:
   determining effective repetition period of the power supply lanes,
   determining a number of the power supply lanes and,
   determining a programmed delay based upon the effective repetition period and the number of power supply lanes, wherein the programmed delay is to be determined in a different manner when there is intrinsic delay present in the power supply lanes versus when there is no intrinsic delay present in the power supply lanes and wherein the programmed delay is to be introduced between the power supply lanes to cause spacing of individual power supply lane loads to reduce an overlapping and alignment of the individual power supply lane loads in the power supply lanes.

2. The method of claim 1, wherein determining the programmed delay time is to comprise dividing the effective repetition period of the lanes by the number of lanes.

3. The method of claim 2, further comprising introducing the programmed delay between the clock signals of each lane.

4. A method to reduce Alternate Current (AC) peak to peak power supply noise by controlling delay between power supply lanes comprising:

identifying effective repetition period of the power supply lanes, identifying number of the power supply lanes, determining intrinsic delay time of the power supply lanes, and determining programmed delay based upon the effective repetition period, intrinsic delay and number of lanes, wherein the programmed delay is to be determined in a different manner when there is intrinsic delay present in the power supply lanes versus when there is no intrinsic delay present in the power supply lanes and wherein the programmed delay is to be introduced between the power supply lanes to cause spacing of individual power supply lane loads to reduce an overlapping and alignment of the individual power supply lane loads in the power supply lanes.

5. The method of claim 4, wherein determining comprises determining programmed delay by subtracting intrinsic delay from the programmed delay.

6. The method of claim 5, further comprising introducing the programmed delay between the clock signals of each lane.

7. An I/O interface comprising:

a plurality of power supply lanes to be switched on, a delay circuit to provide a programmed delay between the power supply lanes to switch-on successive power supply lanes after the programmed delay, and a delay control logic to control the time delay in the delay circuit based on an effective repetition delay of the plurality of the power supply lanes, wherein the programmed delay is to be determined in a different manner when there is intrinsic delay present in the power supply lanes versus when there is no intrinsic delay present in the power supply lanes and wherein the programmed delay is to be introduced between the power supply lanes to cause spacing of individual power supply lane loads to reduce an overlapping and alignment of the individual power supply lane loads in the power supply lanes.

8. The I/O interface of claim 7, wherein each lane generates an intrinsic delay.

9. The I/O interface of claim 7, wherein each lane does not generates an intrinsic delay.

10. A system comprising:

a processor, a chipset to facilitate I/O signal to be transmitted to a computer system, I/O devices to provide instructions to the computer system, I/O interfaces to couple the I/O devices with the chipset to provide a programmed delay between power supply lanes to switch-on successive power supply lanes after the programmed delay, wherein the chipset is to determine the programmed delay based on the effective delay of the power supply lanes, wherein the programmed delay is to be determined in a different manner when there is intrinsic delay present in the power supply lanes versus when there is no intrinsic delay present in the lanes and wherein the programmed delay is to be introduced between the power supply lanes to cause spacing of individual power supply lane loads to reduce an overlapping and alignment of the individual power supply lane loads in the power supply lanes.

11. The system of claim 10, wherein the interface has a programmed delay provided between each set of lanes.

12. The system of claim 10, wherein the I/O interface has the programmed delay provided between the clock cycles of the lanes.

13. The method of claim 1, wherein a delay circuit is to comprise an amplifier to amplify a signal from another lane, a transistor, and a capacitor, wherein the transistor is to be biased to implement a resistance and wherein the transistor and capacitor are to form a resistance-capacitance network to indicate the programmed delay by adjusting a bias of the transistor to effect a change of an output of the amplifier.

14. The method of claim 4, wherein a delay circuit is to comprise an amplifier to amplify a signal from another lane, a transistor, and a capacitor, wherein the transistor is to be biased to implement a resistance and wherein the transistor and capacitor are to form a resistance-capacitance network to indicate the programmed delay by adjusting a bias of the transistor to effect a change of an output of the amplifier.

15. The interface of claim 7, wherein the delay circuit is to comprise an amplifier to amplify a signal from another lane, a transistor, and a capacitor, wherein the transistor is to be biased to implement a resistance and wherein the transistor and capacitor are to form a resistance-capacitance network to indicate the programmed delay by adjusting a bias of the transistor to effect a change of an output of the amplifier.

16. The system of claim 10, wherein each of the I/O interfaces are to comprise a delay circuit to comprise an amplifier to amplify a signal from another lane, a transistor, and a capacitor, wherein the transistor is to be biased to implement a resistance and wherein the transistor and capacitor are to form a resistance-capacitance network to indicate the programmed delay by adjusting a bias of the transistor to effect a change of an output of the amplifier.

17. The method of claim 4, wherein an occurrence of the intrinsic delay is due to presence of clock skew or routing.

* * * * *